United States Patent [19]
Todd

[11] 4,165,751
[45] Aug. 28, 1979

[54] BEATER GRATE FOR COMBINE

[75] Inventor: Robert R. Todd, Leola, Pa.

[73] Assignee: Sperry Rand Corporation, New Holland, Pa.

[21] Appl. No.: 894,322

[22] Filed: Apr. 7, 1978

[51] Int. Cl.$^2$ .............................................. A01F 12/28
[52] U.S. Cl. ................................ 130/27 S; 130/27 L; 130/27 T
[58] Field of Search .................. 130/27 R, 27 J, 27 K, 130/27 L, 27 S, 27 T; 56/14.6

[56] References Cited
U.S. PATENT DOCUMENTS

| | | | |
|---|---|---|---|
| 1,191,853 | 7/1916 | Thompson | 130/27 L |
| 1,449,645 | 3/1923 | Anderson | 130/27 S |
| 3,916,912 | 11/1975 | Rowland-Hill | 130/27 T |

*Primary Examiner*—Russell R. Kinsey
*Attorney, Agent, or Firm*—C. Hercus Just; Frank A. Seemar; John B. Mitchell

[57] ABSTRACT

This invention pertains to a combine of the axial flow type in which rotor means extend longitudinally within the combine in association with concaves, the rotor having in axial alignment, a threshing portion and a separating portion rearward thereof and mounted for coaction with respective concaves disposed beneath the rotor. Tailings which are discharged from the separator section of the rotor and concave normally contain a worthwhile amount of crop material intermixed with waste chaff, straw and the like, and further threshing to separate the crop material from the waste material is effected by a rotatable beater and coacting grate which extend transversely to the axis of the rotor and rearward of the discharge end of the separator portion of the rotor and concave. To adapt the use of the combine to a wide range of different crop materials, the grate for the beater is adjustably supported for movement toward and from the beater by slidable wedge members respectively engageable with opposite ends of the grate, the adjustment being effected externally of the housing of the combine.

7 Claims, 4 Drawing Figures

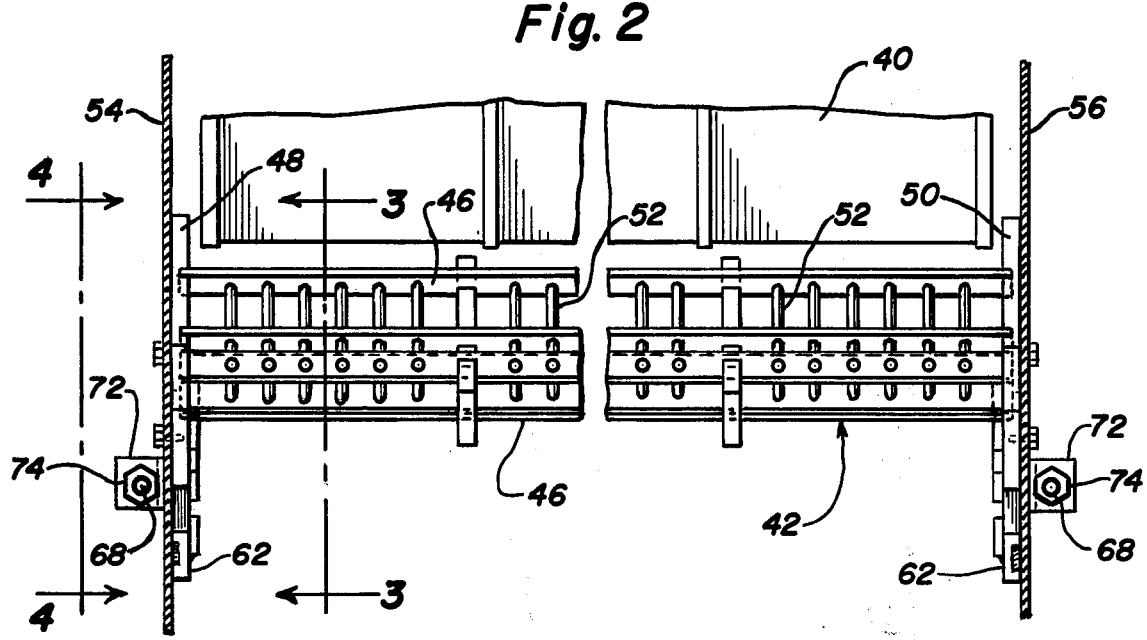
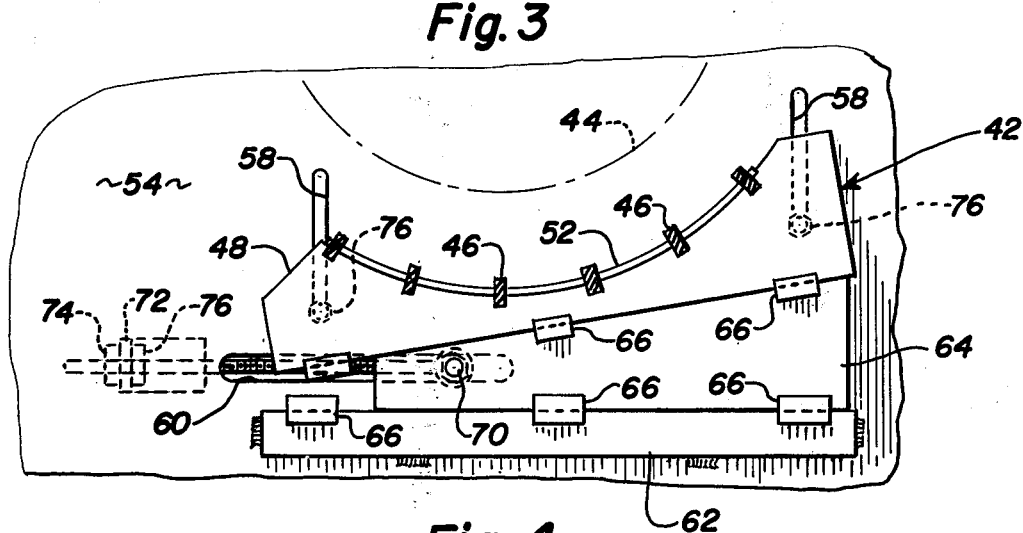
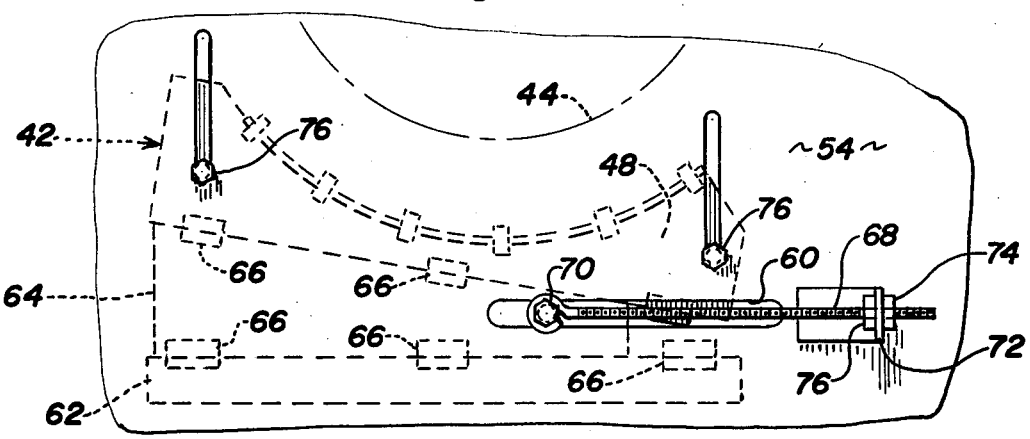

BEATER GRATE FOR COMBINE

BACKGROUND OF THE INVENTION

Modern combines which are designed to harvest and thresh a relatively wide range of agricultural products necessarily must be adjustable to adapt the same to the efficient threshing of such products, regardless of type, size and kind, and the principal aim is to obtain as close as possible a 100% recovery of the desired crop product rather than discharge it with the waste that normally falls from the rearend of the combine. This is accomplished in the present invention by employing a rotatable beater and coacting beater grate which receives tailings from the normal threshing and separating sections of the rotor and concave of a combine. Although the adjustability of threshing and separating concaves with respect to the threshing and separating rotor sections is known in the art, especially for purposes of adapting the combine to effectively handle a wide variety of agricultural crop materials, it appears that attention has never previously been given to adapting any type of adjustment to the means by which the tailings are subjected to further beating and separating functions, especially to consider the differences in the crop materials being harvested at any one time by the combine.

It also is old in the art, especially in regard to conventional threshing machines, to arrange concaves with threshing spikes thereon for adjustment of at least one end thereof toward and from the threshing drum, the opposite end of said concave usually being pivoted about a fixed axis so that only one end of the concave was adjustable in a radial direction. Arrangements of this type are shown in U.S. Pat. No. 750,902 to Shelton et al, dated Feb. 2, 1904; U.S. Pat. No. 918,285 to Clark, dated Apr. 13, 1909; U.S. Pat. No. 1,449,645 to Anderson, dated Mar. 27, 1923; and U.S. Pat. No. 2,484,228 to Isay, dated Oct. 11, 1949. There also is U.S. Pat. No. 2,931,363 to Bulin, dated Apr. 5, 1960, in which a concave is mounted for adjustment of the opposite ends thereof toward and from a rotatable threshing drum by means of a pivoted lever having links extending therefrom for connection to said opposite ends of the concave, whereby pivotal movement of the lever effects such adjustment. A safety release feature also is included in said patent comprising a removable pin which permits the pivoted lever to be "dropped" for instant lowering of the concave with respect to the drum. None of these patents show any suggestion of being applied to means to operate upon tailings in a modern type of combine, such as shown in U.S. Pat. No. 3,669,125 to Rowland-Hill, dated June 13, 1972, in which a transverse beater is shown for operation upon tailings but no adjustment is provided for the grate which cooperates with the beater.

SUMMARY OF THE INVENTION

It is the principal object of the invention to provide means to effectively and efficiently cause separation of desired crop material from tailings as received from the normal threshing and separating rotors and concaves of a modern type of combine by the utilization of a beater which is rotatable about an axis transverse to the axis of the normal rotors and concaves and cooperable with an arcuate beater grate supported by means permitting substantially even adjustments of the entire grate radially with respect to the peripheral path of the elements of the beater.

It is another object of the present invention to employ similar wedge members supported adjacent opposite sides of the housing of the combine and respectively engageable with end plates on the concave and in which the movement of the concave in radial direction is controlled by guide slots in the sides of the housing and movement of the wedges, which act as cams, is controlled by fixed supporting rails secured to the inner surfaces of the opposite sides of said housing.

A further object of the invention is to effect movement of said camming wedges by threaded rods connected at one end to said wedges by means extending through horizontal guide slots which are perpendicular to the aforementioned slots which control the radial movement of the opposite ends of the beater grate, said threaded rods being external of the side members of the housing and the opposite ends thereof being adjustably connected to external brackets which maintain the desired adjustment of the wedge members, such threaded means being capable of very precise adjustment of the beater grate with respect to the peripheral path of the beater elements, and rotatable nuts on said threaded rods when rotated in one direction, effect movement of the wedges in the direction to cause radial movement of the beater grate toward the axis of the beater and lock nuts on said threaded rods maintain the same in a desired position of adjustment, said position also being further assured by employing bolts which extend through said aforementioned guide slots for the end plates of the beater grate, whereby when said bolts are tightened, they effectively secure the end plates of the beater grate firmly against the inner surfaces of the opposite side members of the housing of the combine and, thereby, assure effective operation of the beater and beater grate to obtain maximum efficiency of separating desired crop material from the tailings before discharging the waste from the tailings from the combine.

Details of the foregoing objects and of the invention, as well as other objects thereof, are set forth in the following specification and illustrated in the accompanying drawings comprising a part thereof.

DETAILED DESCRIPTION OF THE DRAWINGS

FIG. 2 is a fragmentary vertical sectional view foreshortened transversely, and showing details of the invention as seen on the line 2—2 of FIG. 1.

FIG. 3 is a fragmentary vertical sectional elevation on a scale similar to that used in FIG. 2, showing the means by which one end of the beater grate is moved radially toward the axis of the beater, said view illustrating said mechanism on the inner surface of the side of the housing of the combine.

FIG. 4 is a fragmentary vertical elevation of the exterior of one side of the housing of the combine and showing the exterior of the mechanism otherwise shown in FIG. 3 with respect to said one end of the beater concave.

DETAILED DESCRIPTION

Figure 1:
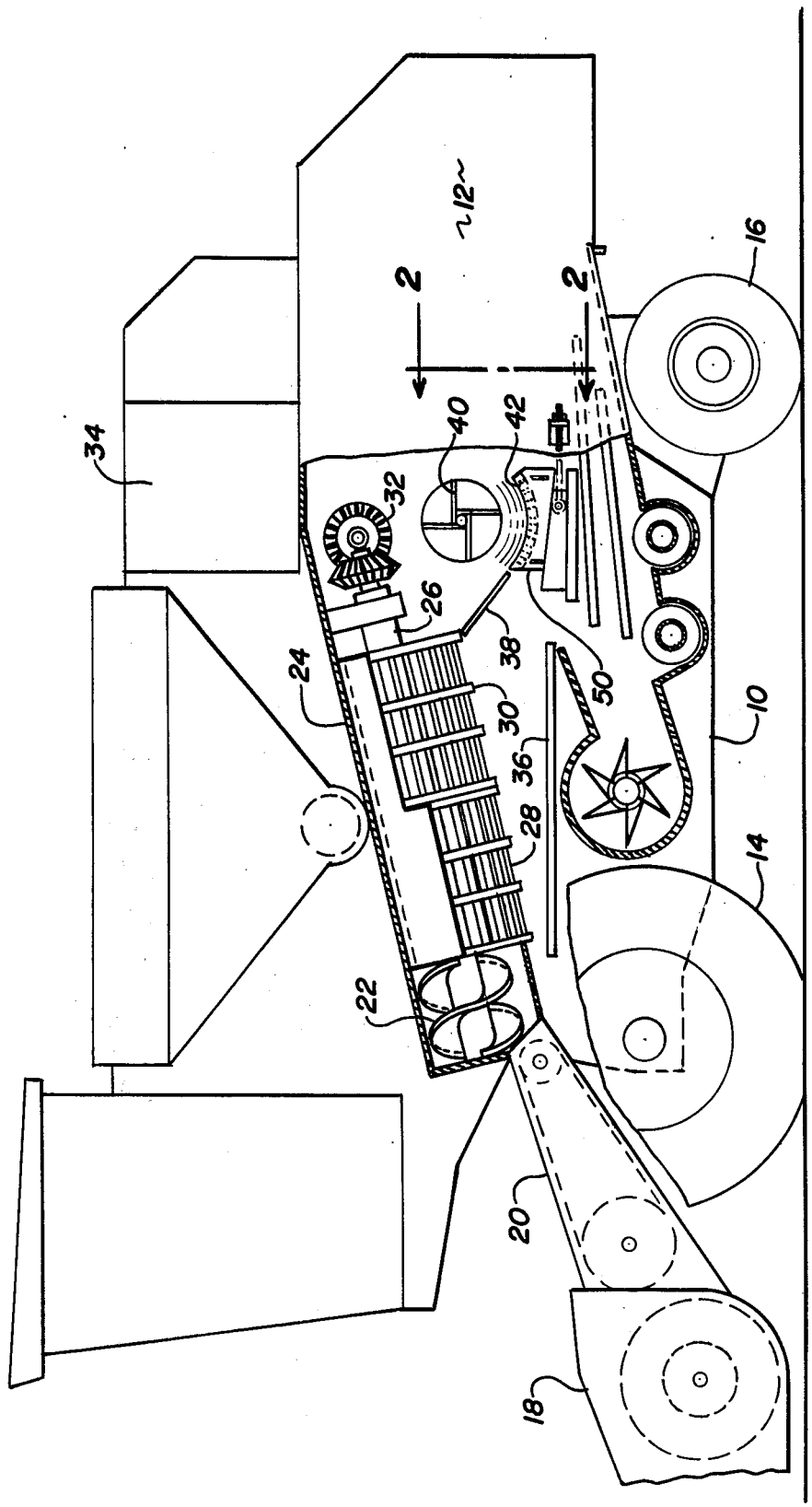
FIG. 1 is a side elevation of an exemplary modern type of combine in which the central portion thereof has been illustrated in vertical section to disclose details of the present invention.

Referring to FIG. 1, there is illustrated therein, partially in a fragmentary manner and partially in vertical section, an exemplary combine of the type to which the present invention pertains. Said combine comprises a mobile frame 10 which supports a housing 12 for movement along a field to be harvested by means of forward drive wheels 14 and rearward steering wheels 16. A header 18, which is only fragmentarily shown, is on the forward end of the combine and is of conventional type which cuts, consolidates, and delivers the material to elevator 20 and moves the material upward for engagement by augers 22 in the forward end of the threshing compartment 24 in which one or more threshing rotors are mounted upon axial shafts 26, said threshing rotors preferably having both threshing and separating sections or portions which respectively cooperate with threshing concave 28 and separating concave 30. The axial shafts 26 are driven by bevel gears 32, or other equivalent mechanical means that are powered by the normal means, such as Diesel engine 34. Initially threshed material drops onto receiving means 36 and tailings are discharged from the rearend of the separating concave 30 onto guide means 38 for transfer to the beater 40 and beater grate 42, which act upon said tailings to separate to as high a degree as possible, any desired product material from the waste tailings, as described hereinafter.

The present invention is concerned with means which operate after threshing and initial separation has been performed upon the crop material and pertains to supplemental separation in an effort to produce, as far as possible, full recovery of all desirable crop material and minimizes discharge of any of it with the waste, such as straw, chaff and the like. To this end, the invention pertains to the treatment of the tailings by means of the beater 40 and beater grate 42, the details of which and the operation thereof are best illustrated in FIGS. 2–4.

Referring to FIGS. 3 and 4, the peripheral path of the beater is exemplified by circle 44. The beater grate comprises a plurality of bars 46, which extend transversely between end plates 48 and 50 and are securely fixed thereto. Curved wires 52 extend through said bars 46 to constitute an effective beater grate. The housing of the combine has opposite sides 54 and 56 which are parallel to each other and these are each provided with a pair of parallel, vertical slots 58, which extend toward the axis of the beater 44. Said sides of the housing also each include a single horizontal slot 60. Affixed to the inner surface of each of the sides 54 and 56, is a horizontal supporting guide rail 62. Slidable upon the upper surface of the guide rails 62 is a wedge-shaped, cam-like adjustable supporting plate 64. The upper edge of said plate 64 slidably engages the lower surface of one of the end plates 48, 50, of the beater grate 42. Since the guide rail 62, wedge plate 64, and end plate 48 or 50 of the beater grate 42 are all plate-like and are in vertical alignment, it will be seen that the end plates 48 and 50 of the beater grate are disposed slidably against the inner surfaces of the sides 54 and 56 of the housing of the combine and thus, cannot move away from said inner surfaces, the wedge plates 64 are maintained in operative position by guide members which may be of any suitable type, such as small members 66, which are welded respectively to the end plates 48,50 of beater grate 42 and guide rails 62.

Adjustable movement of the wedge plate 64 is effected by means of threaded rods 68 which preferably are exterior of the sides 54 and 56 of the housing and one end of each of the rods 68 is connected such as by a suitable bolt 70 to one end of each of the wedge plates 64. The opposite end of the rod 68 extends through a projecting ear of a bracket 72, said brackets being securely fixed to the outer surfaces of the sides 54 and 56 of the housing of the combine. Elevating movement of the beater grate 42 is effected by backing off nut 76 and operating nut 74 on the rod 68 which engages the projecting ear 72 and pulls the wedge plate 64 in a direction to raise the end plates 48 and 50 radially toward the axis of the beater 44. When the desired position of adjustment has been reached, a lock nut 76 is tightened to secure the supporting wedge plate 64 in said desired position of adjustment. Further assurance of maintaining said adjusted position is achieved by clamping bolts 76 which threadably engage the end plates 48 and 50 of the beater grate 42 and respectively engage the outer surfaces of the sides 54 and 56 of the housing.

When it is desired to lower the beater grate 42 away from the axis of the beater 40, the nuts 76 and 74 are appropriately manipulated to permit the rods 68 to move in retracting direction together with the wedge plate 64. When the clamping bolts 76 are released, gravity will then permit the end plates 48 and 50 of the beater grate 42 to move in downward direction until the upper surface of the wedge plates 64 are engaged for support thereby.

From the foregoing, it will be seen that the present invention provides simple, but highly effective and rugged construction for adjusting the beater grate of a combine relative to the beater which functions to treat the tailings as received from the normal threshing and separating rotor and concave members, after the initial threshing and separation has occurred, all for the purpose of maximizing the recovery of desired crop material from a threshing operation and minimize the discharge of any crop material with the waste from the threshing operation. The adjustability of the beater grate toward and from the beater may be achieved readily, with even minute precision, due to the provision of the threaded rods 68 and the nuts which engage the same, thereby adapting the combine to operate the maximum efficiency upon the tailings of a wide range of crop materials to be handled by the combine.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. A combine having a mobile frame, a housing having sidewalls supported by said frame, threshing means comprising rotary threshing cylinder means extending axially of said combine and supported within said housing by said frame for rotation by power means on said combine, concave means below said threshing cylinder means and cooperating with the same to receive crop material to be threshed as received at the forward end thereof and operable to thresh said material and move the same axially rearward to separating means axially rearward of said threshing cylinder and concave means and coaxial therewith within said housing and between said sidewalls thereof, and beater means adjacent the rearward end of said separating means and extending transversely across the exit end of the same to receive and further separate crop material discharged from said separating means, said beater means comprising a beater member rotatable about an axis transverse to that of said separating means thereby defining a predetermined peripheral path, and a concave beater grate having end members adjacent said sidewalls and extending coaxially beneath the lower portion of said peripheral path of said beater member; in combination with rail means secured to said sidewalls, and support members slidable on said rail means and engaging said end members of said concave beater grate to support said concave beater grate for adjustable radial movement toward and from said peripheral path of said beater member, thereby to effect maximum efficiency of operation of said beater member and grate relative to different types of material capable of being threshed by said combine.

2. The combine according to claim 1 in which said support members are wedge members having sloping upper surfaces slidably engageable with said end plates on said beater grate which are parallel to each other and to said sidewalls and lower edges on said wedge members slidably engaging said supporting rail members.

3. The combine according to claim 2 further including means to move said wedge members slidably as aforesaid comprising threaded rods connected at one end respectively to said wedge members and the opposite ends being movable relative to bracket members on said sidewalls of said housing and adjustably secured to said bracket members when a desired adjusted position for said beater grate has been determined.

4. The combine according to claim 3 in which said sidewalls of said housing have guide slots therein parallel to said guide rails, and pin means connected to said wedge members extend through said guide slots and are connected to said connected end of said threaded rods.

5. The combine according to claim 3 in which said bracket members have ears extending outward from said sidewalls of said housing and provided with holes through which said threaded rods extend, and lock nuts threaded on said rods engage opposite sides of said ears to maintain said rods secure in desired adjusted positions according to the desired positions according to the desired position of said beater grate relative to the beater rotor.

6. The combine according to claim 4 in which guide members are connected to said supporting rail members and also to said end plates of said beater grate for slidable engagement by the opposite edges of said wedge members to retain the same operatively within vertical planes common to said end plates and supporting rail members.

7. The combine according to claim 3 in which said sidewalls of said housing are provided with pairs of parallel slots extending perpendicularly relative to said guide rails and the slots of each pair being spaced apart substantially the width of the end plates of said beater grate, and threaded clamping members extending through said slots and clampingly engaging the opposite ends of said end plates of said beater grate to secure the same in a desired adjusted position relative to said beater.

* * * * *